United States Patent
Ji et al.

(10) Patent No.: US 10,917,873 B2
(45) Date of Patent: Feb. 9, 2021

(54) SIGNAL SENDING METHOD, SIGNAL RECEIVING METHOD, AND CORRESPONDING DEVICE

(71) Applicant: Huawei Technologies Co., Ltd., Shenzhen (CN)

(72) Inventors: Tong Ji, Beijing (CN); Yuwan Su, Beijing (CN); Xiaolei Tie, Shanghai (CN); Zhe Jin, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,640

(22) Filed: Nov. 4, 2019

(65) Prior Publication Data
US 2020/0068526 A1 Feb. 27, 2020

Related U.S. Application Data

(63) Continuation of application No. PCT/CN2017/083336, filed on May 5, 2017.

(51) Int. Cl.
*H04W 52/02* (2009.01)
*H04W 68/02* (2009.01)
(Continued)

(52) U.S. Cl.
CPC .......... *H04W 68/02* (2013.01); *H04W 8/18* (2013.01); *H04W 52/0235* (2013.01); *H04W 72/12* (2013.01); *H04W 76/28* (2018.02)

(58) Field of Classification Search
CPC ... H04W 68/02; H04W 8/18; H04W 52/0235; H04W 72/12; H04W 76/28; H04W 52/0216; H04W 52/02
See application file for complete search history.

(56) References Cited

U.S. PATENT DOCUMENTS

2007/0254679 A1   11/2007   Montojo et al.
2011/0164513 A1*  7/2011   Lecki ............... H04W 52/0245
                                                                        370/252

(Continued)

FOREIGN PATENT DOCUMENTS

CN    105208640 A    12/2015
CN    105493591 A    4/2016
CN    106341877 A    1/2017

OTHER PUBLICATIONS

"Discussion on Paging in NB-IoT," 3GPP TSG RAN2 #92, Anaheim, US, R2-156551, pp. 1-6, 3rd Generation Partnership Project, Valbonne, France (Nov. 16-20, 2015).

(Continued)

*Primary Examiner* — Joseph E Dean, Jr.
(74) *Attorney, Agent, or Firm* — Leydig, Voit & Mayer, Ltd.

(57) ABSTRACT

The Application discloses a signal sending method that includes: generating, by a network device, a first indication signal, where the first indication signal is used to indicate that a terminal device is not paged and/or no system message changes, the first indication signal corresponds to a first international mobile subscriber identity (IMSI) set, and a quantity of IMSIs in the first IMSI set is less than or equal to a quantity of IMSIs corresponding to one paging occasion (PO); and sending, by the network device, the first indication signal to a first terminal device, where the first terminal device is a terminal device corresponding to any IMSI in the first IMSI set.

18 Claims, 6 Drawing Sheets

(51) Int. Cl.
*H04W 8/18* (2009.01)
*H04W 72/12* (2009.01)
*H04W 76/28* (2018.01)

(56) References Cited

U.S. PATENT DOCUMENTS

2012/0040700 A1   2/2012  Gomes et al.
2014/0004850 A1*  1/2014  Kwon .................... H04W 68/02
2020/0029303 A1*  1/2020  Liu ...................... H04W 72/048

OTHER PUBLICATIONS

"Paging for NB-IoT," 3GPP TSG RAN WG1 Meeting #84, St Julian's, Malta, R1-160921, pp. 1-3, 3rd Generation Partnership Project, Valbonne, France (Feb. 15-19, 2016).

* cited by examiner

SIGNAL SENDING METHOD, SIGNAL RECEIVING METHOD, AND CORRESPONDING DEVICE

CROSS-REFERENCE TO RELATED APPLICATIONS

This application is a continuation of International Application No. PCT/CN2017/083336, filed on May 5, 2017, the disclosure of which is hereby incorporated by reference in its entirety.

TECHNICAL FIELD

This application relates to the field of communications technologies, and in particular, to a signal sending method, a signal receiving method, and a corresponding device.

BACKGROUND

In a wireless communications system, a terminal device has two modes. One mode is a connected mode, indicating that the terminal device has established a connection to a network device, and can directly communicate with the network device; and the other mode is an idle mode (also referred to as a sleep mode), and the terminal device can enter the idle mode to reduce power consumption when sending or receiving no service. However, the terminal device in the idle mode cannot directly communicate with the network device. To ensure that the network device can effectively find out the terminal device in the idle mode, the network device usually sends a paging scheduling signal to the terminal device regularly, to indicate whether the terminal device should switch from the idle mode to the connected mode, so as to communicate with the network device. The terminal device in the idle mode regularly wakes up to listen to the paging scheduling signal, and a cycle of regularly waking up is referred to as a discontinuous reception (DRX) cycle. A moment at which the terminal device wakes up in the DRX cycle is referred to as a paging occasion (PO). The terminal device in the idle mode remains in the idle mode in most of time during the DRX cycle. The terminal device only wakes up at a corresponding PO to listen to the paging scheduling signal, and the terminal device needs to wake up at only one PO to listen to the paging scheduling signal in a DRX cycle.

In some wireless communications systems, many terminal devices may remain in the idle mode during most of the time, and need to constantly listen to a paging scheduling signal to determine whether the terminal device is paged or a system message changes. Services of many terminal devices belong to an active reporting type, a probability of being paged is relatively low, and a change frequency of a system message is also relatively low. In addition, when the network device needs to page the terminal device, a delay from a moment at which a paging requirement is generated to a moment at which the terminal device is actually paged cannot be excessively long. Therefore, for these terminal devices in the idle mode, the network device does not send the paging scheduling signal to the terminal devices at a PO in most of the DRX cycles. However, the terminal device still needs to wake up to listen to the paging scheduling signal at the PO in each DRX cycle. In addition, in some wireless communications system, especially in the internet of things system, the terminal device may listen to a paging scheduling signal for a long time, leading to more power consumption and a shorter standby time of the terminal device.

In addition, in the wireless communications system, a plurality of terminal devices share a PO in a DRX cycle, that is, the plurality of terminal devices listen to a paging scheduling signal at a same PO. In particular, in a scenario in which a DRX cycle is short, when the DRX cycle is short, there are usually not many POs in the DRX cycle, consequently, a relatively large quantity of terminal devices listen to a same PO. When the plurality of terminal devices share a PO, even if a paging scheduling signal exists at the PO, the paging scheduling signal may be directed to a small quantity or even one of all terminal devices sharing the PO. However, other terminal devices still need to receive the paging scheduling signal, and can determine that the terminal devices are not paged only after parsing a paging message (where the parsing message is scheduled by the paging scheduling signal). Consequently, the power consumption of the terminal device is increased, and the standby time of the terminal device is shortened.

SUMMARY

Embodiments of this application provide a signal sending method, a signal receiving method, and a corresponding device, to reduce a probability that a terminal device listens to a paging scheduling signal when the terminal device does not need to listen to the paging scheduling signal.

According to a first aspect, an embodiment of this application provides a signal sending method, including: generating, by a network device, a first indication signal, where the first indication signal is used to indicate that a terminal device is not paged and/or no system message changes, the first indication signal corresponds to a first international mobile subscriber identity (IMSI) set, and a quantity of IMSIs in the first IMSI set is less than or equal to a quantity of IMSIs corresponding to one PO. In other words, the quantity of IMSIs in the first IMSI set is less than or equal to a quantity of terminal devices sharing one PO. In this embodiment of this application, a signal used to indicate that a terminal device is not paged and/or no system message changes is a first-type indication signal. The first indication signal is a first-type indication signal corresponding to the first IMSI set, and is an example of the first-type indication signal. The network device sends the first indication signal to a first terminal device, where the first terminal device is a terminal device corresponding to any IMSI in the first IMSI set.

In the foregoing technical solution, when a terminal device corresponding to an IMSI set is not paged and/or no system message changes, the network device sends the first-type indication signal to the terminal device corresponding to the IMSI set, to indicate that the terminal device is not paged and/or no system message changes. After receiving the first-type indication signal, the terminal device may not listen to a paging scheduling signal, thereby reducing a probability that the terminal device listens to the paging scheduling signal when the terminal device does not need to listen to the paging scheduling signal. The terminal device may spend far less time listening to the first-type indication signal than listening to the paging scheduling signal. Therefore, after receiving the first-type indication signal, the terminal device does not listen to the paging scheduling signal, thereby reducing power consumption and extending a standby time. In addition, because a quantity of IMSIs in the IMSI set may be less than a quantity of IMSIs corresponding to one PO, when only some of all terminal devices sharing a PO are paged and/or no system message changes, IMSIs of all or some terminal devices that are not paged and/or whose system message does not change at the PO may be in one IMSI set. The network device may send the first-type indication signal to the terminal device corresponding to the IMSI set, and the terminal device receiving the first-type indication signal may not listen to the paging scheduling signal, thereby reducing the power consumption.

In an optional manner, before the network device sends the first indication signal to the first terminal device, the network device sends higher layer signaling or a system message to the first terminal device. The higher layer signaling or the system message is used to indicate a time resource and/or a frequency resource of the first indication signal. The higher layer signaling may be a radio resource control (RRC) signaling. The system message may be a system information block (SIB) or a master system module (MIB). Then, the network device sends the first indication signal to the first terminal device on the time resource and/or the frequency resource. In this implementation, the terminal device and the network device agree on a transmission resource for listening to the first-type indication signal, to ensure that the terminal device successfully receives the first-type indication signal sent by the network device to the terminal device.

In an optional manner, the signal sending method further includes: generating, by the network device, a third indication signal, where the third indication signal is used to indicate that a terminal device is paged and/or a system message changes, the third indication signal corresponds to a sixth IMSI set, and a quantity of IMSIs in the sixth IMSI set is less than or equal to a quantity of IMSIs corresponding to one PO. In this embodiment of this application, a signal used to indicate that a terminal device is paged and/or a system message changes is a second-type indication signal. The third indication signal is a second-type indication signal corresponding to the sixth IMSI set, and is an example of the second-type indication signal. The network device sends the third indication signal to a second terminal device, and the second terminal device is a terminal device corresponding to any IMSI in the sixth IMSI set. In the foregoing technical solution, the network device may separately send indication signals of different types to a terminal device that corresponds to an IMSI set and that needs to listen to a paging scheduling signal and to a terminal device that corresponds to the IMSI set and that does not need to listen to the paging scheduling signal, to be applicable to a case in which a plurality of terminal devices corresponding to one PO have different requirements for listening to the paging scheduling signal, thereby reducing a probability that another terminal device corresponding to a PO listens to the paging scheduling signal because some terminal devices corresponding to the PO are paged and/or a system message changes, and reducing power consumption of the terminal device that is not paged and/or whose system message does not change.

According to a second aspect, an embodiment of this application provides a signal receiving method, including: listening to, by a terminal device, an indication signal, where the indication signal includes a first indication signal, the first indication signal is used to indicate that a terminal device is not paged and/or no system message changes, the first indication signal corresponds to a first IMSI set, a quantity of IMSIs in the first IMSI set is less than or equal to a quantity of IMSIs corresponding to one PO, and an IMSI of the terminal device belongs to the first IMSI set; and maintaining, by the terminal device, a state of not listening to a paging scheduling signal at a PO of the terminal device if the first indication signal is received. In this implementation, when a terminal device corresponding to an IMSI set is not paged and/or no system message changes, the network device sends the first-type indication signal to the terminal device corresponding to the IMSI set, to indicate that the terminal device is not paged and/or no system message changes. After receiving the first-type indication signal, the terminal device may not listen to the paging scheduling signal, thereby reducing a probability that the terminal device listens to the paging scheduling signal when the terminal device does not need to listen to the paging scheduling signal. The terminal device may spend far less time listening to the first-type indication signal than listening to the paging scheduling signal. Therefore, after receiving the first-type indication signal, the terminal device does not listen to the paging scheduling signal, thereby reducing power consumption and extending a standby time. In addition, because a quantity of IMSIs in the IMSI set may be less than a quantity of IMSIs corresponding to one PO, when only some of all terminal devices sharing a PO are paged and/or no system message changes, IMSIs of all or some terminal devices that are not paged and/or whose system message does not change at the PO may be in one IMSI set. The network device may send the first-type indication signal to the terminal device corresponding to the IMSI set, and the terminal device receiving the first-type indication signal may not listen to the paging scheduling signal, thereby reducing the power consumption.

In an optional manner, after the terminal device listens to the indication signal, the terminal device listens to a paging scheduling signal at the PO of the terminal device if the first indication signal is not received. In this implementation, when a terminal device corresponding to an IMSI in the IMSI set needs to listen to the paging scheduling signal, the network device may not send the indication signal to the terminal device corresponding to the IMSI set, to save a resource, and the terminal device corresponding to the IMSI set may still correctly learn that the terminal device may be paged or a system message may change.

In an optional manner, the indication signal further includes a third indication signal, used to indicate that a terminal device is paged and/or a system message changes, and the third indication signal corresponds to a first IMSI set. After the terminal device listens to the indication signal, the terminal device listens to a paging scheduling signal at the PO of the terminal device if the third indication signal is received. In this implementation, the network device may separately send indication signals of different types to a terminal device that corresponds to an IMSI set and that needs to listen to the paging scheduling signal and a terminal device that corresponds to the IMSI set and that does not need to listen to the paging scheduling signal, to be applicable to a case in which a plurality of terminal devices corresponding to one PO have different requirements for listening to the paging scheduling signal, thereby reducing a probability that another terminal device corresponding to a PO listens to the paging scheduling signal because some terminal devices corresponding to the PO are paged and/or a system message changes, and reducing power consumption of a terminal device that is not paged and/or whose system message does not change.

According to a third aspect, an embodiment of this application provides a signal sending method, including: generating, by a network device, a third indication signal, where the third indication signal is used to indicate that a terminal device is paged and/or a system message changes, the third indication signal corresponds to a sixth IMSI set, and a quantity of IMSIs in the sixth IMSI set is less than or equal to a quantity of IMSIs corresponding to one PO; and sending, by the network device, the third indication signal to a second terminal device, where the second terminal device is a terminal device corresponding to any IMSI in the sixth IMSI set. In this implementation, when any terminal device corresponding to an IMSI set is paged and/or a system message changes, the network device sends a second-type indication signal to the terminal device corresponding to the IMSI set (where the third indication signal is an example of the second-type indication signal), and the terminal device may determine, after receiving the second-type indication signal, that the terminal device may be paged and/or a system message may change, so as to listen to a paging scheduling signal at a PO. Correspondingly, when none of the terminal devices corresponding to the IMSI set is paged and/or no system message changes, the network device does not send the second-type indication signal to the terminal device corresponding to the IMSI set, and the terminal device may determine, after the terminal device does not receive the second-type indication signal, that the terminal device is not paged and/or no system message changes, so as to not listen to the paging scheduling signal at the PO. The network device differentiates the terminal device that corresponds to the IMSI set and that needs to listen to the paging scheduling signal and the terminal device that corresponds to the IMSI set and that does not need to listen to the paging scheduling signal. The network device sends the second-type indication signal only to the terminal device that corresponds to the IMSI set and that needs to listen to the paging scheduling signal, so that the terminal device that corresponds to the IMSI set and that needs to listen to the paging scheduling signal may determine, according to the second-type indication signal, that the terminal device may be paged and/or a system message may change, and the terminal device that corresponds to the IMSI set and that does not need to listen to the paging scheduling signal may determine that the terminal device is not paged and/or no system message changes, to be applicable to a case in which a plurality of terminal devices corresponding to one PO have different requirements for listening to the paging scheduling signal, thereby reducing a probability that another terminal device corresponding to a PO listens to the paging scheduling signal because some terminal devices corresponding to the PO are paged and/or a system message changes, and reducing power consumption of a terminal device that is not paged and/or whose system message does not change.

According to a fourth aspect, an embodiment of this application provides a signal receiving method, including: listening to, by a terminal device, a third indication signal, where the third indication signal is used to indicate that a terminal device is paged and/or a system message changes, the third indication signal corresponds to a sixth IMSI set, a quantity of IMSIs in the sixth IMSI set is less than or equal to a quantity of IMSIs corresponding to one PO, and an IMSI of the terminal device belongs to the sixth IMSI set; and listening to, by the terminal device, a paging scheduling signal at a PO of the terminal device if the third indication signal is received.

In an optional manner, after the terminal device listens to the third indication signal, the terminal device maintains a state of not listening to the paging scheduling signal at the PO of the terminal device if the third indication signal is not received.

According to a fifth aspect, an embodiment of this application provides a network device. The network device has a function of implementing behavior of the network device according to the first aspect in the foregoing method. The function may be implemented by using hardware, or may be implemented by hardware executing corresponding software. The hardware or the software includes one or more modules corresponding to the foregoing function.

In a possible design, a structure of the network device includes a processor and a transmitter. The processor is configured to support the network device in performing a corresponding function in the foregoing method. The transmitter is configured to: support communication between the network device and a terminal device, and send information or signaling used in the foregoing method to the terminal device. The network device may further include a memory. The memory is configured to be coupled with the processor and store a necessary program instruction and necessary data of the network device.

According to a sixth aspect, an embodiment of this application provides a terminal device. The terminal device has a function of implementing behavior of the terminal device according to the second aspect in the foregoing method. The function may be implemented by using hardware, or may be implemented by hardware executing corresponding software. The hardware or the software includes one or more modules corresponding to the foregoing function.

In a possible design, a structure of the terminal device includes a receiver and a processor. The receiver is configured to receive a signal or information sent by a network device. The processor is configured to support the terminal device in performing a corresponding function in the foregoing method according to the second aspect.

According to a seventh aspect, an embodiment of this application provides a network device. The network device has a function of implementing behavior of the network device according to the third aspect in the foregoing method. The function may be implemented by using hardware, or may be implemented by hardware executing corresponding software. The hardware or the software includes one or more modules corresponding to the foregoing function.

In a possible design, a structure of the network device includes a processor and a transmitter. The processor is configured to support the network device in performing a corresponding function in the foregoing method. The transmitter is configured to: support communication between the network device and a terminal device, and send information or signaling used in the foregoing method to the terminal device. The network device may further include a memory. The memory is configured to be coupled with the processor and store a necessary program instruction and necessary data of the network device.

According to an eighth aspect, an embodiment of this application provides a terminal device. The terminal device has a function of implementing behavior of the terminal device according to the fourth aspect in the foregoing method. The function may be implemented by using hardware, or may be implemented by hardware executing corresponding software. The hardware or the software includes one or more modules corresponding to the foregoing function.

In a possible design, a structure of the terminal device includes a receiver and a processor. The receiver is configured to receive a signal or information sent by a network device. The processor is configured to support the terminal device in performing a corresponding function in the foregoing method according to the second aspect.

In the foregoing embodiments provided in this application, in a possible design, the terminal device corresponding to the IMSI set may be paged, but a system message does not change. When none of the terminal devices corresponding to the IMSI set is paged, the network device generates a first-type indication signal of a type 1, and the first-type indication signal of the type 1 is used to indicate that a terminal device is not paged. Then, the network device sends the first-type indication signal of the type 1 to the terminal device corresponding to the IMSI set. After receiving the first-type indication signal of the type 1, the terminal device can maintain the state of not listening to a paging scheduling signal, thereby reducing the power consumption.

In the foregoing embodiments provided in this application, in a possible design, a system message of the terminal device corresponding to the IMSI set may change, but the terminal device is not paged. When none of system messages of all terminal devices corresponding to the IMSI set changes, the network device generates a first-type indication signal of a type 2, and the first-type indication signal of the type 2 is used to indicate that no system message of the terminal device changes. Then, the network device sends the first-type indication signal of the type 2 to the terminal device corresponding to the IMSI set. After receiving the first-type indication signal of the type 2, the terminal device can maintain the state of not listening to a paging scheduling signal, thereby reducing the power consumption.

In the foregoing embodiments provided in this application, in a possible design, the terminal device corresponding to the IMSI set may be paged, and a system message may change. When none of the terminal devices corresponding to the IMSI set is paged, and no system message changes, the network device generates a first-type indication signal of a type 3, and the first-type indication signal of the type 3 is used to indicate that a terminal device is not paged and no system message changes. Then, the network device sends the first-type indication signal of the type 3 to the terminal device corresponding to the IMSI set. After receiving the first-type indication signal of type 3, the terminal device can maintain the state of not listening to a paging scheduling signal, thereby reducing the power consumption.

In the foregoing embodiments provided in this application, in a possible design, the first IMSI set is a subset of an IMSI set corresponding to a first PO, and the first PO is a PO of the first terminal device. In other words, an IMSI set is a subset of an IMSI set corresponding to one PO.

In the foregoing embodiments provided in this application, in a possible design, a union set of the first IMSI set and at least one second IMSI set is an IMSI set corresponding to a first PO, any IMSI set in the at least one second IMSI set corresponds to a second indication signal, and the second indication signal is used to indicate that a terminal device is not paged and/or no system message changes. In other words, each IMSI set in a plurality of IMSI sets is a subset of an IMSI set corresponding to one PO, and a union set of the plurality of IMSI sets is an IMSI set corresponding to the PO.

In the foregoing embodiments provided in this application, in a possible design, the first IMSI set includes a plurality of subsets, and any one of the plurality of subsets is a subset of an IMSI set corresponding to any PO. In other words, one IMSI set includes a plurality of subsets, each subset is a subset of an IMSI set corresponding to any PO, and different subsets of the IMSI set may correspond to different POs. In this implementation, because a same IMSI set can correspond to terminal devices at the different POs, the network device can instruct the terminal devices corresponding to the different POs by sending a first-type indication signal, to improve flexibility of instructing the terminal device.

In the foregoing embodiments provided in this application, in a possible design, a union set of the first IMSI set and at least one third IMSI set is an IMSI set corresponding to at least two POs, any IMSI set of the at least one third IMSI set corresponds to a second indication signal, the second indication signal is used to indicate that a terminal device is not paged and/or no system message changes, and any subset of each IMSI set of the at least one third IMSI set is a subset of an IMSI set corresponding to any PO. In other words, each of the plurality of IMSI sets includes a plurality of subsets. Each subset of each IMSI set is a subset of an IMSI set corresponding to any PO. Different subsets of each IMSI set may correspond to different POs, and a union set of the plurality of IMSI sets is an IMSI set corresponding to a plurality of POs. In this implementation, because a same IMSI set may correspond to terminal devices at different POs, the network device can instruct the terminal devices corresponding to the different POs by sending a first-type indication signal, to improve flexibility of instructing the terminal device.

In the foregoing embodiments provided in this application, in a possible design, the first IMSI set includes at least one subset, any one of the at least one subset is an IMSI set corresponding to at least one terminal device identity corresponding to a first PO, and the first PO is a PO of the first terminal device. In other words, one IMSI set includes at least one subset, and each subset is an IMSI set corresponding to at least one terminal device identity corresponding to a same PO. In this implementation, IMSI sets can be divided based on a small quantity of terminal device identities, thereby providing higher efficiency.

In the foregoing embodiments provided in this application, in a possible design, a union set of the first IMSI set and at least one fourth IMSI set is an IMSI set corresponding to a first PO, any IMSI set of the at least one fourth IMSI set corresponds to a second indication signal, the second indication signal is used to indicate that a terminal device is not paged and/or no system message changes, and any subset of each IMSI set of the at least one fourth IMSI set is an IMSI set corresponding to at least one terminal device identity corresponding to the first PO. In other words, each of a plurality of IMSI sets includes at least one subset, each subset of each IMSI set is an IMSI set corresponding to at least one terminal device identity corresponding to a same PO, and a union set of the plurality of IMSI sets is an IMSI set corresponding to one PO. In this implementation, IMSI sets can be divided based on a small quantity of terminal device identities, thereby providing higher efficiency.

In the foregoing embodiments provided in this application, in a possible design, the first IMSI set includes a plurality of subsets, and any one of the plurality of subsets is an IMSI set corresponding to at least one terminal device identity corresponding to any PO. In other words, one IMSI set includes a plurality of subsets, each subset is an IMSI set corresponding to at least one terminal device identity corresponding to any PO, and different subsets of the IMSI set may correspond to different POs. In this implementation, IMSI sets can be divided based on a small quantity of terminal device identities, thereby providing higher efficiency. In addition, because a same IMSI set may correspond to terminal devices at different POs, the network device can instruct the terminal devices corresponding to the different POs by sending a first-type indication signal, to improve flexibility of instructing the terminal device.

In the foregoing embodiments provided in this application, in a possible design, a union set of the first IMSI set and at least one fifth IMSI set is an IMSI set corresponding to at least two POs, any IMSI set in the at least one fifth IMSI set corresponds to a second indication signal, the second indication signal is used to indicate that a terminal device is not paged and/or no system message changes, and any subset of each IMSI set of the at least one fifth IMSI set is an IMSI set corresponding to at least one terminal device identity corresponding to any PO. In other words, each of the plurality of IMSI sets includes a plurality of subsets. Each subset of each IMSI set is an IMSI set corresponding to at least one terminal device identity corresponding to any PO. Different subsets of each IMSI set may correspond to different POs, and a union set of the plurality of IMSI sets is an IMSI set corresponding to a plurality of POs. In this implementation, IMSI sets can be divided based on a small quantity of terminal device identities, thereby providing higher efficiency. In addition, because a same IMSI set may correspond to terminal devices at different POs, the network device can instruct the terminal devices corresponding to the different POs by sending a first-type indication signal, to improve flexibility of instructing the terminal device.

In the foregoing embodiments provided in this application, in a possible design, higher layer signaling or a system message is used to indicate a time resource of the first indication signal. A moment corresponding to a time resource in a first discontinuous reception DRX cycle is not later than a PO of the first terminal device in the first DRX cycle, to ensure that the terminal device can maintain, in a timely manner according to the first-type indication signal, the state of not listening to a paging scheduling signal at the PO, to reduce the power consumption.

In the foregoing embodiments provided in this application, in a possible design, the first IMSI set corresponds to a transmission resource for the first indication signal, or the first IMSI set corresponds to a combination of a transmission resource for the first indication signal and a signal format of the first indication signal. The transmission resource may be one or more of a time resource, a frequency resource, a code domain resource, or the like. In this implementation, a first-type indication signal can be sent to different IMSI sets by using different transmission resources or by using different combinations of the transmission resources and the signal format, to ensure that each terminal device can correctly receive the first-type indication signal that is sent to the terminal device.

In the foregoing embodiments provided in this application, in a possible design, before the network device sends the first indication signal to the first terminal device, the network device sends higher layer signaling or a system message to the second terminal device, and the higher layer signaling or the system message is used to indicate a time resource and/or a frequency resource of the first indication signal. The network device specifically sends the first indication signal to the first terminal device on the time resource and/or the frequency resource.

In the foregoing embodiments provided in this application, in a possible design, the sixth IMSI set is a subset of an IMSI set corresponding to a second PO, and the second PO is a PO of the second terminal device.

In an optional manner, the sixth IMSI set includes a plurality of subsets, and any one of the plurality of subsets is a subset of an IMSI set corresponding to any PO.

In the foregoing embodiments provided in this application, in a possible design, that the third indication signal corresponds to a sixth IMSI set includes: the sixth IMSI set corresponds to a transmission resource for the third indication signal, or the sixth IMSI set corresponds to a combination of a transmission resource for the third indication signal and a format of the third indication signal.

According to a ninth aspect, an embodiment of this application provides a computer-readable storage medium. The readable storage medium stores a computer instruction, and when the instruction is run on a computer, the computer is enabled to perform the method according to any one of the first aspect, the possible implementations of the first aspect, the second aspect, the possible implementations of the second aspect, the third aspect, the possible implementations of the third aspect, the fourth aspect, and the possible implementation of the fourth aspect.

In the embodiments of this application, based on the implementations according to the foregoing aspects, further combination may be performed to provide more implementations.

DESCRIPTION OF EMBODIMENTS

Figure 1:
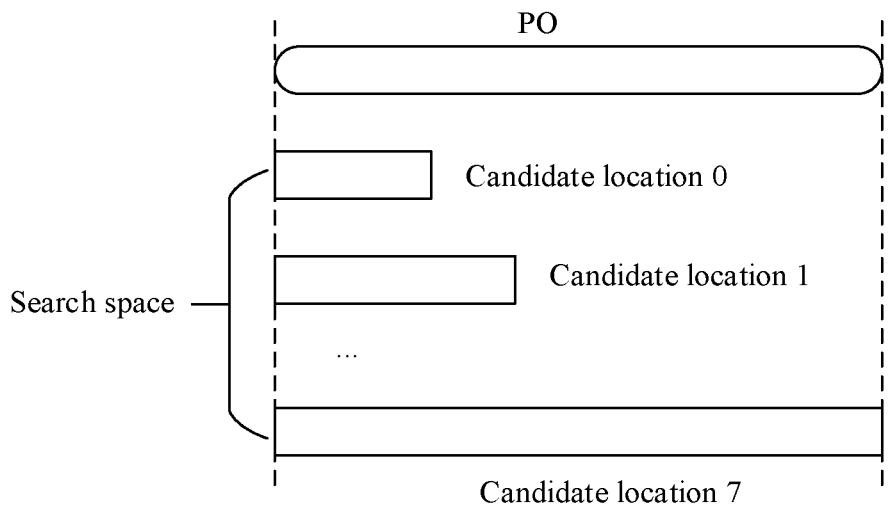
FIG. 1 is a schematic diagram of listening to a paging scheduling signal at a PO.

The following further describes in detail embodiments of this application with reference to accompanying drawings.

The embodiments of this application may be applicable to a long term evolution (LTE) system, such as a narrowband internet of things (NB-IoT) system; or may alternatively be applicable to another wireless communications system, for example, a global system for mobile communications (GSM), a universal mobile telecommunications system (UMTS), a code division multiple access (CDMA) system, and a new network device system. Specific embodiments are described below by using the NB-IoT system as an example.

A terminal device mentioned in the embodiments of this application may be a device that provides a user with voice and/or data connectivity, a handheld device with a radio connection function, or another processing device connected to a wireless modem. A wireless terminal device may communicate with one or more core networks through a radio access network (RAN). The wireless terminal device may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal device may be a device such as a personal communications service (PCS) phone, a cordless telephone set, a session initiation protocol (SIP) phone, a wireless local loop (WLL) station, or a personal digital assistant (PDA). The wireless terminal device may alternatively be referred to as a system, a subscriber unit, a subscriber station, a mobile station, a mobile console, a remote station, an access point, a remote terminal, an access terminal, a user terminal, a user agent, a user device, or user equipment (UE).

A network device used in the embodiments of this application may be a base station, and the base station may be configured to mutually convert a received over-the-air frame and an Internet Protocol (IP) packet and serve as a router between the wireless terminal device and a remaining part of an access network. The remaining part of the access network may include an IP network device. The base station may coordinate attribute management of an air interface. For example, the base station may be a base transceiver station (BTS) in the global system for mobile communications (GSM) or the code division multiple access (CDMA) system, or may be a NodeB in a wideband code division multiple access (WCDMA) system, or may alternatively be an evolved Node B (eNB or e-NodeB) in an LTE system, and this is not limited in the embodiments of this application.

It should be understood that, in descriptions of this application, words such as "first" and "second" are merely used for distinction and description, and shall not be understood as an indication or implication of relative importance or an indication or implication of an order. In the descriptions of this application, "a plurality of" means two or more.

The following first describes the prior art related to the embodiments of this application.

In the NB-IoT, a network device sends a paging scheduling signal to a terminal device on a physical downlink control channel (PDCCH) at a PO in a DRX cycle. The paging scheduling signal may alternatively be referred to as a PDCCH signal, and the PO may be identified by a terminal device identity of the terminal device. For example, the terminal device identity is a user equipment identity (UE Identity, UEID). The terminal device in an idle mode detects a PDCCH signal in a blind detection manner in a PDCCH search space. The PDCCH search space refers to a set of possible candidate locations for a target PDCCH signal, and a PO is a start location at which the terminal device listens to the PDCCH signal, to determine a start location of a search space, and perform blind detection based on the location. As shown in FIG. 1, in a search space, one block represents one candidate location. In the NB-IoT system, there are eight candidates in the search space being paged, the terminal device sequentially performs blind detection on different candidate locations in a search space having a PO location as a start location, until the detection is successful. If the terminal device fails to detect all the candidate locations, the terminal device continues to listen to the PDCCH at the corresponding PO location in a next DRX.

The sending of the PDCCH signal by the network device may include the following three cases:

Case 1: If a terminal device in a plurality of terminal devices sharing a PO is paged, the network device uses a PDCCH format 1 signal to schedule a physical downlink shared channel (PDSCH) signal at the PO. The PDSCH signal includes an international mobile subscriber identity (IMSI) of the terminal device that is paged, and a system message change indication.

Case 2: If none of a plurality of terminal devices sharing a PO is paged, but a system message changes, the network device sends a PDCCH format 2 signal at the PO. The PDCCH format 2 signal is not used to schedule a PDSCH signal and directly carries a system message change indication.

Case 3: If none of a plurality of terminal devices sharing a PO is paged, and no system message changes, the network device does not send a PDCCH signal at the PO.

All of the foregoing three cases possibly occur at a PO. For the three cases, the terminal device listens to the PDCCH signal at the PO of the terminal device, and the following corresponding cases are provided.

For the case 1, if the terminal device can detect the PDCCH format 1 signal, the terminal device considers that the network device may page the terminal device, and a system message may change. The terminal device reads a PDSCH signal scheduled by using the PDCCH signal, to determine whether the IMSI of the terminal device is carried in the PDSCH signal. If the PDSCH signal carries the IMSI of the terminal device, the terminal device needs to switch from an idle mode to a connected mode, and performs a corresponding receiving or sending operation. If the PDSCH signal does not carry the IMSI of the terminal device, the terminal device considers that the network device does not page the terminal device, but the terminal device further determines, based on the system message change indication in the PDSCH signal, whether the system message changes. If the system message changes, the terminal device needs to re-read the system message, and if no system message changes, the terminal device does not need to re-read the system message.

For the case 2, if the terminal device can detect the PDCCH format 2 signal, the terminal device considers that the network device does not page the terminal device, but a system message may change, and the terminal device may need to re-read the system message.

For the case 3, if the terminal device does not detect the PDCCH signal in the blind detection manner in all candidate locations in the search space, the terminal device determines that the network device does not page the terminal device, and no system message changes. In this case, the terminal device may continue to remain in the idle mode.

Because uplink services are main services in the NB-IoT, a probability that the network device pages the terminal device is relatively low, and a change frequency of a system message is also relatively low. Therefore, for the terminal device in the idle mode, at most PO of the terminal device, the network device does not send a paging scheduling signal, namely, a PDCCH signal, to the terminal device. However, the terminal device still needs to listen to the paging scheduling signal at each PO, leading to more power consumption and a shorter standby time of the terminal device.

Figure 2:
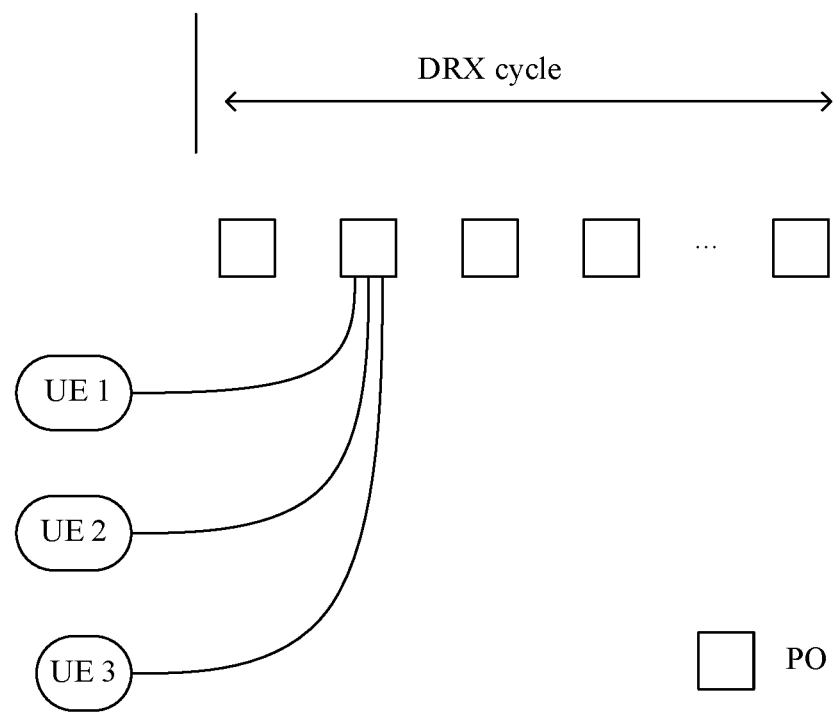
FIG. 2 is a schematic diagram showing that a plurality of terminal devices listen to a paging scheduling signal at a PO.

In addition, referring to FIG. 2, in the NB-IoT system, there is a limited quantity of POs in a DRX cycle, and a large quantity of terminal devices share one PO. For example, terminal devices corresponding to 4096 terminal device identities may share one PO, and each terminal device identity may correspond to a plurality of IMSIs, and one IMSI corresponds to one terminal device. When a network device sends a paging scheduling signal when needing to page one or several terminal devices (such as UE 1 shown in FIG. 2) at a PO, all other terminal devices sharing this PO (such as UE 2 and UE 3 shown in FIG. 2) need to listen to the paging scheduling signal based on the case 1, read the PDSCH signal, determine whether an IMSI of the terminal device is included in the PDSCH signal, and restore to the idle mode after determining that the IMSI of the terminal device is not included in the PDSCH signal. It can be learned that, when the terminal device is not paged and no system message changes, the terminal device still receives the paging scheduling signal and reads the PDSCH signal, leading to more power consumption of the terminal device, a waste of power, and a shorter service life of a battery.

For a prior-art problem that the terminal device listens to a paging scheduling signal when the terminal device does not need to listen to the paging scheduling signal, and the power consumption is consequently increased, the embodiments of this application provide a signal sending method, a signal receiving method, and a corresponding device, to reduce a probability that the terminal device listens to a paging scheduling signal when the terminal device does not need to listen to the paging scheduling signal, and reduce the power consumption of the terminal device.

Embodiment 1

Figure 3:
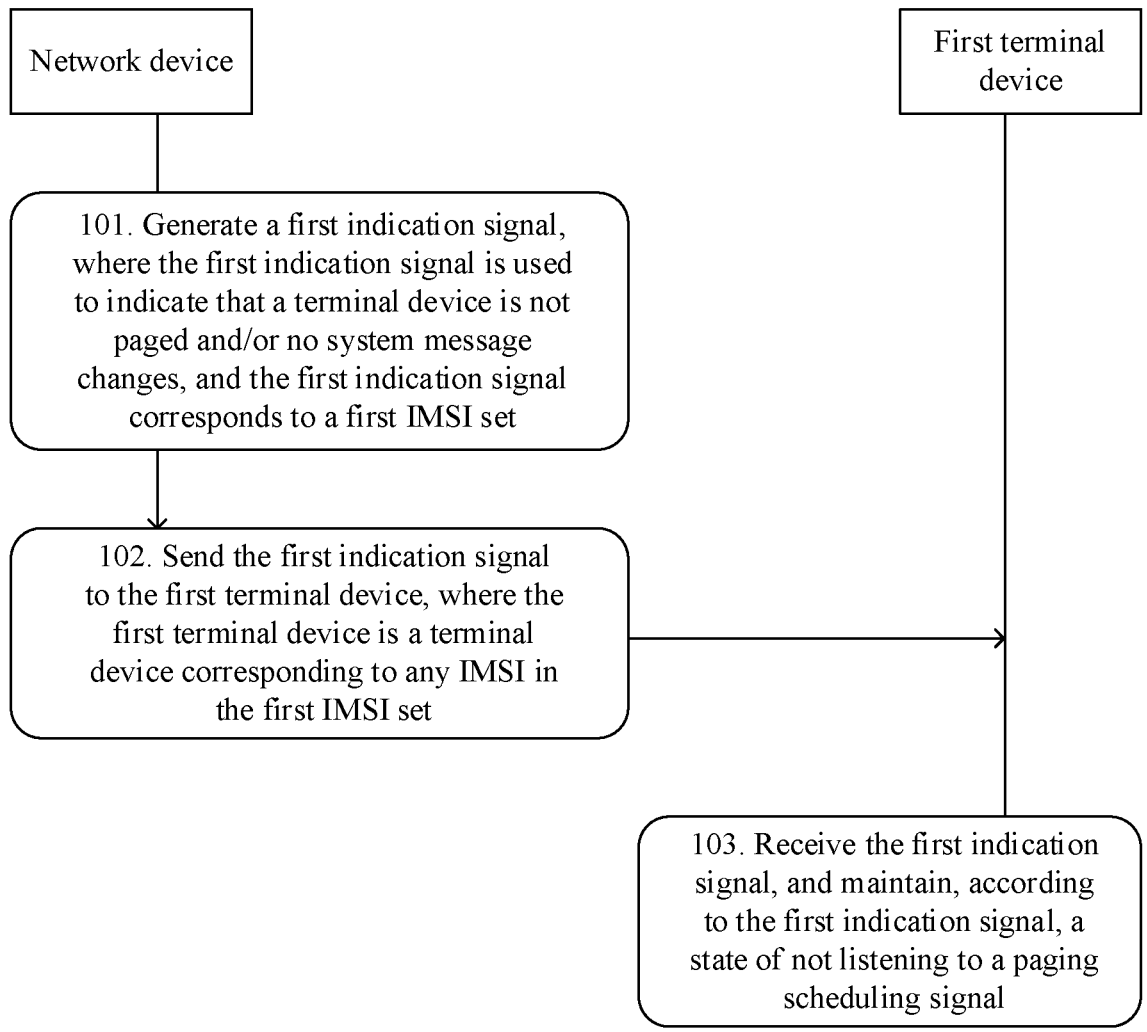
FIG. 3 is a schematic flowchart of a signal sending method according to an embodiment of this application.

FIG. 3 is a schematic flowchart of a signal sending method according to Embodiment 1 of this application. The method includes the following steps.

Step 101. A network device generates a first indication signal, where the first indication signal is used to indicate that a terminal device is not paged and/or no system message changes, the first indication signal corresponds to a first IMSI set, and a quantity of IMSIs in the first IMSI set is less than or equal to a quantity of IMSIs corresponding to one PO.

In this embodiment of this application, a signal that is used to indicate that a terminal device is not paged and/or no system message changes is referred to as a first-type indication signal. The first indication signal is a first-type indication signal corresponding to the first IMSI set, and is an example of the first-type indication signal. The second indication signal according to Summary in this application is an example corresponding to another IMSI set than the first IMSI set. The first-type indication signal may be a preset sequence, and the sequence may be a common pseudo-random sequence, a Gold sequence, a Hadamard sequence, a Zadoff-Chu sequence, or the like, or a variation of the sequences, for example, a product sequence of a plurality of sequences, or a sequence obtained after circular shift extension or punching. The first-type indication signal may alternatively be a data packet, that is, a transport block formed by encoding and modulating an original information bit. For example, the original information bit of the first-type indication signal may be "0", "1", "00", "01", "10", or "11".

The quantity of IMSIs corresponding to one PO is a quantity of terminal devices sharing one PO. In some implementations, quantities of IMSIs corresponding to different POs in a DRX cycle are the same, and in some other implementations, quantities of IMSIs corresponding to different POs in a DRX cycle may be different. If the quantities of IMSIs corresponding to different POs in a DRX cycle are different, and a minimum value is MIN, the quantity of IMSIs in the first IMSI set is less than or equal to MIN. If the quantities of IMSIs corresponding to different POs in a DRX cycle are the same, the quantity of IMSIs in the first IMSI set is less than or equal to a quantity of IMSIs corresponding to any PO.

Step 102. The network device sends the first indication signal to a first terminal device, where the first terminal device is a terminal device corresponding to any IMSI in the first IMSI set. In some implementations, different terminal devices corresponding to the first IMSI set may be distributed in different cells, and a network device in each cell sends the first indication signal to a terminal device whose IMSI belongs to the first IMSI set in the cell of the network device.

In this embodiment of this application, an IMSI set is used as a unit. When none of terminal devices corresponding to an IMSI set is paged and/or no system message changes, the network device can generate a first-type indication signal, and send the first-type indication signal to the terminal device corresponding to the IMSI set, to indicate that the terminal device is not paged and/or no system message changes. For ease of description, in this embodiment of this application, the first IMSI set is used as an example for description. The first IMSI set may be any IMSI set, and the first-type indication signal sent to the first IMSI set is referred to as the first indication signal.

Step 103. The first terminal device receives the first indication signal, and maintains, according to the first indication signal, a state of not listening to a paging scheduling signal. In some implementations, the first terminal device maintains, according to the first indication signal, the state of not listening to a paging scheduling signal at an agreed PO. The agreed PO may be a next PO after the first terminal device receives the first indication signal; or the agreed PO may be an $M^{th}$ PO after the first terminal device receives the first indication signal, where M is an integer greater than 1; or the agreed PO may be N consecutive POs after the first terminal device receives the first indication signal, where N is an integer greater than 1. Alternatively, the first indication signal carries a number of a DRX cycle, and the first terminal device determines, based on the number, to maintain the state of not listening to a paging scheduling signal in the DRX cycle corresponding to the number.

In the foregoing technical solution, when a terminal device corresponding to the IMSI set is not paged and/or no system message changes, the network device generates a first-type indication signal, and sends the first-type indication signal to the terminal device corresponding to the IMSI set, to indicate that the terminal device is not paged and/or no system message changes. After receiving the first-type indication signal, the terminal device may not listen to a paging scheduling signal, thereby reducing a probability that the terminal device listens to the paging scheduling signal when the terminal device does not need to listen to the paging scheduling signal. Because the paging scheduling signal needs to carry scheduling information of a paging message, dozens of bits need to be carried. Further considering overheads of cyclic redundancy check (CRC) code, the terminal device needs to spend a relatively long time receiving the paging scheduling signal. In this embodiment of this application, the first-type indication signal may carry only several bits, such as one or two bits, so that the terminal device can spend far less time listening to an indication signal in this embodiment of this application than listening to the paging scheduling signal. Therefore, after receiving the first-type indication signal, the terminal device does not listen to the paging scheduling signal, thereby reducing power consumption and extending a standby time.

In addition, in this embodiment of this application, because a quantity of IMSIs in an IMSI set may be less than a quantity of IMSIs corresponding to one PO, when some of all terminal devices sharing a PO are paged and/or no system message changes, IMSIs of all or some terminal devices that are not paged and/or whose system message does not change at the PO may be in one IMSI set. The network device may generate the first-type indication signal, send the first-type indication signal to the terminal device corresponding to the IMSI set, and the terminal device receiving the first-type indication signal may not listen to the paging scheduling signal, thereby reducing the power consumption. It should be noted that the network device sends the first-type indication signal to the terminal device corresponding to the IMSI set causes no effect on a terminal device that is paged and/or whose system message changes at the PO, and the terminal device that is paged and/or whose system message changes can still listen to the paging scheduling signal. Because a quantity of terminal devices indicated by the first-type indication signal may be not greater than a quantity of terminal devices sharing one PO, the network device can indicate that some terminal devices corresponding to the PO are not paged and/or no system message changes, thereby reducing a probability that another terminal device corresponding to a PO listens to the paging scheduling signal because some terminal devices corresponding to the PO are paged and/or a system message changes, and reducing the power consumption of the terminal device that is not paged and/or whose system message does not change.

In an optional manner, a terminal device corresponding to an IMSI set may be paged, but a system message does not change. When none of terminal devices corresponding to the IMSI set is paged, the network device generates a first-type indication signal of a type 1, and the first-type indication signal of the type 1 is used to indicate that a terminal device is not paged. Then, the network device sends the first-type indication signal of the type 1 to the terminal device corresponding to the IMSI set. After receiving the first-type indication signal of the type 1, the terminal device can maintain a state of not listening to a paging scheduling signal, thereby reducing the power consumption.

In an optional manner, a system message of a terminal device corresponding to an IMSI set may change, but the terminal device is not paged. When none of the system messages of all terminal devices corresponding to the IMSI set changes, the network device generates a first-type indication signal of a type 2, and the first-type indication signal of the type 2 is used to indicate that no system message of the terminal device changes. Then, the network device sends the first-type indication signal of the type 2 to the terminal device corresponding to the IMSI set. After receiving the first-type indication signal of the type 2, the terminal device can maintain a state of not listening to a paging scheduling signal, thereby reducing the power consumption.

In an optional manner, a terminal device corresponding to an IMSI set may be paged, and a system message may change. When none of terminal devices corresponding to the IMSI set is paged, and no system message changes, the network device generates a first-type indication signal of a type 3, and the first-type indication signal of the type 3 is used to indicate that a terminal device is not paged and no system message changes. Then, the network device sends the first-type indication signal of the type 3 to the terminal device corresponding to the IMSI set. After receiving the first-type indication signal of the type 3, the terminal device can maintain a state of not listening to a paging scheduling signal, thereby reducing the power consumption.

In this embodiment of this application, a granularity indicated by a first-type indication signal is an IMSI set. An IMSI set and a PO may have a plurality of correspondences, which include but are not limited to the following correspondences.

Correspondence 1: One IMSI set is a subset of an IMSI set corresponding to one PO, including a case in which the IMSI set is the IMSI set corresponding to the PO.

Correspondence 2: Each of a plurality of IMSI sets is a subset of an IMSI set corresponding to one PO, and a union set of the plurality of IMSI sets is an IMSI set corresponding to the PO. At least a second IMSI set described in the Summary of this application conforms to the correspondence 2.

Correspondence 3: One IMSI set includes a plurality of subsets, each subset is a subset of an IMSI set corresponding to any PO, and different subsets of the IMSI set may correspond to different POs. For example, the first IMSI set includes a first subset and a second subset. The first subset is a subset of an IMSI set corresponding to a PO 1, and the second subset is a subset of an IMSI set corresponding to a PO 2.

Correspondence 4: Each of a plurality of IMSI sets includes a plurality of subsets. Each subset of each IMSI set is a subset of an IMSI set corresponding to any PO. Different subsets of each IMSI set may correspond to different POs, and a union set of the plurality of IMSI sets is an IMSI set corresponding to a plurality of POs. At least a third IMSI set described in the Summary of this application conforms to the correspondence 4.

Correspondence 5: One IMSI set includes at least one subset, and each subset is an IMSI set corresponding to at least one terminal device identity corresponding to a same PO, including a case in which the IMSI set is the IMSI set corresponding to the PO.

Correspondence 6: Each of a plurality of IMSI sets includes at least one subset, each subset of each IMSI set is an IMSI set corresponding to at least one terminal device identity corresponding to a same PO, and a union set of the plurality of IMSI sets is an IMSI set corresponding to one PO. At least a fourth IMSI set described in the Summary of this application conforms to the correspondence 6.

Correspondence 7: One IMSI set includes a plurality of subsets, each subset is an IMSI set corresponding to at least one terminal device identity corresponding to any PO, and different subsets of the IMSI set may correspond to different POs. For example, the first IMSI set includes a third subset and a fourth subset. The third subset is a subset of an IMSI set corresponding to at least one terminal device identity corresponding to a PO 3, and the fourth subset is a subset of an IMSI set corresponding to at least one terminal device identity corresponding to a PO 4.

Correspondence 8: Each of a plurality of IMSI sets includes a plurality of subsets. Each subset of each IMSI set is an IMSI set corresponding to at least one terminal device identity corresponding to any PO. Different subsets of each IMSI set may correspond to different POs, and a union set of the plurality of IMSI sets is an IMSI set corresponding to a plurality of POs. At least a fifth IMSI set described in the Summary of this application conforms to the correspondence 8.

In the correspondence 5 to the correspondence 8, IMSI sets can be divided based on a small quantity of terminal device identities, thereby providing higher efficiency.

In the correspondence 3 and the correspondence 4, and the correspondence 7 and the correspondence 8, because a same IMSI set may correspond to terminal devices at different POs, the network device can instruct the terminal devices corresponding to the different POs by sending a first-type indication signal, to improve flexibility of instructing the terminal device.

Figure 4A:
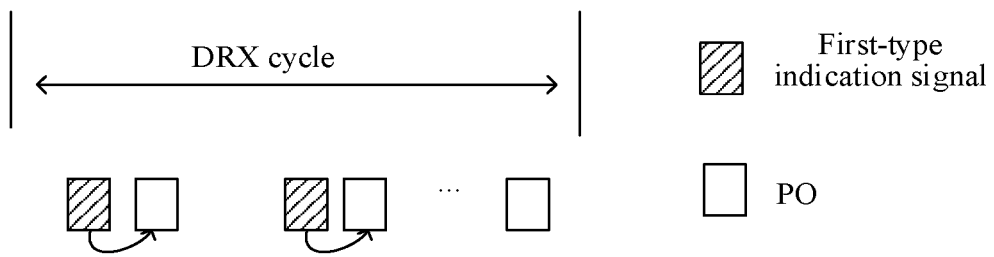
FIG. 4a to FIG. 4c are schematic diagrams of a first-type indication signal and a PO according to an embodiment of this application.

For the correspondence 1 and the correspondence 5, the IMSI set may be the IMSI set corresponding to the PO. In this case, the network device instructs the terminal devices corresponding to a PO by sending a first-type indication signal, as shown in FIG. 4*a*.

Figure 4B:
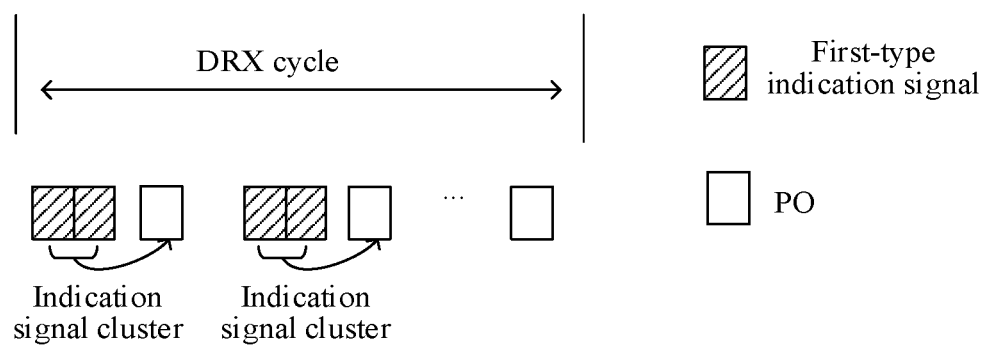

For the correspondence 2 and the correspondence 6, the network device instructs the terminal devices corresponding to a PO by sending a plurality of first-type indication signals. The plurality of first-type indication signals can be consecutively sent, to form an indication signal cluster, as shown in FIG. 4b.

Figure 4C:
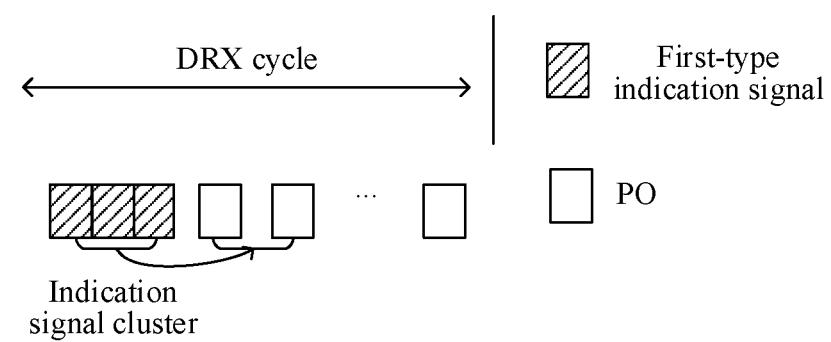

For the correspondence 3 and the correspondence 4, and the correspondence 7 and the correspondence 8, the network device instructs the terminal devices corresponding to a plurality of POs by sending a plurality of first-type indication signals. The plurality of first-type indication signals can be consecutively sent, to form an indication signal cluster, as shown in FIG. 4c.

It should be noted that, the IMSI set in this embodiment of this application can conform to any of the plurality of correspondences. If there is no contradiction, different IMSI sets can also conform to different correspondences. For example, one of a plurality of IMSI sets conforms to the correspondence 1, and another IMSI set conforms to the correspondence 3. In addition, an IMSI set can conform to a plurality of the correspondences. For example, an IMSI set can not only conform to the correspondence 1, but also conform to the correspondence 2 and the correspondence 5. Moreover, in any of the correspondences, a quantity of IMSIs in an IMSI set is not greater than a quantity of IMSIs corresponding to one PO.

In this embodiment of this application, the network device sends the first-type indication signal to the first terminal device at a first agreed moment. The first agreed moment is not later than a PO of the first terminal device in a first DRX cycle, so that the terminal device receives the first-type indication signal at a moment not later than the PO of the terminal device, and further, the terminal device does not listen to a paging scheduling signal according to an indication of the first-type indication signal, thereby reducing the power consumption.

In an optional manner, the first agreed moment can be agreed in a protocol, or can be agreed by the network device and the first terminal device before the network device sends the first-type indication signal to the terminal device. For example, the network device sends higher layer signaling or a system message to the first terminal device. The higher layer signaling or the system message carries time resource indication information, and the terminal device determines, according to the time resource indication information, a moment at which the terminal device listens to the first-type indication signal. The higher layer signaling may be radio resource control (RRC) signaling, and the system message may be a system information block (SIB) or a master system module (MIB).

In an optional manner, the higher layer signaling or the system message can not only carry the time resource indication information, but also one or more of frequency resource indication information, modulation and coding scheme indication information, signal length/size indication information, and DRX cycle indication information. The frequency resource indication information is used to indicate a frequency of listening to a first-type indication signal. The modulation and coding scheme indication information is used to indicate a modulation and coding scheme of the first-type indication signal. The signal length/size indication information is used to indicate a length/size of the first-type indication signal. The DRX cycle indication information is used to indicate a DRX cycle in which the terminal device maintains, according to the first-type indication signal, a state of not listening to a paging scheduling signal.

In this embodiment of this application, an IMSI set may correspond to a first-type indication signal in a plurality of implementations, which include but are not limited to the following manners.

First, an IMSI set corresponds to a transmission resource for a first-type indication signal, and the transmission resource may be a time resource, a frequency resource, a code domain resource, or the like. For example, if the transmission resource is a time resource, a moment at which the first-type indication signal is listened to and that corresponds to an IMSI set 1 is T, and a moment at which the first-type indication signal is listened to and that corresponds to an IMSI set 2 is T2. When none of terminal devices corresponding to the IMSI set 1 and the IMSI set 2 is paged and/or no system message changes, the network device separately sends the first-type indication signal at T1 and T2. The terminal device corresponding to the IMSI set 1 listens to and receives the first-type indication signal at T1, and the terminal device corresponding to the IMSI set 2 listens to and receives the first-type indication signal at T2.

Second, an IMSI set corresponds to a combination of a transmission resource for a first-type indication signal and a format of the first-type indication signal. For example, if the transmission resource is a frequency resource, a frequency on which a first-type indication signal is listened to and that corresponds to both an IMSI set 3 and an IMSI set 4 is f1, and the IMSI set 3 corresponds to a signal format 1 and the IMSI set 4 corresponds to a signal format 2. When none of terminal devices corresponding to the IMSI set 3 and the IMSI set 4 is paged and/or no system message changes, the network device separately sends the first-type indication signal of the signal format 1 and the first-type indication signal of the signal format 2 on the frequency f1. The terminal device corresponding to the IMSI set 3 listens to and receives the first-type indication signal of the signal format 1 on the frequency f1, and the terminal device corresponding to the IMSI set 4 listens to and receives the first-type indication signal of the signal format 2 on the frequency f1.

It should be noted that, the transmission resource in the first and the second manners may alternatively refer to a combination of two or more transmission resources. Using the first manner as an example, the moment at which the first-type indication signal is listened to and that corresponds to the IMSI set 1 is T1 and a frequency on which the first type indication signal is listened to and that corresponds to the IMSI set 1 is f1, and the moment at which the first-type indication signal is listened to and that corresponds to the IMSI set 2 is T2 and a frequency on which the first-type indication signal is listened to and that corresponds to the IMSI set 2 is f2. When none of the terminal devices corresponding to the IMSI set 1 and the IMSI set 2 is paged and/or no system message changes, the network device sends the first-type indication signal at T1 on the frequency f1, and sends the first-type indication signal at T2 on the frequency f2. The terminal device corresponding to the IMSI set 1 listens to and receives the first-type indication signal at T1 on the frequency f1, and the terminal device corresponding to the IMSI set 2 listens to and receives the first-type indication signal at T2 on the frequency f2.

In addition, in this embodiment of this application, a granularity indicated by a first-type indication signal is an IMSI set, to be specific, the first-type indication signal corresponds to an IMSI set in the first manner or the second manner. However, in a specific transmission of the first-type indication signal, the first-type indication signal may be used to indicate only one or several terminal devices corresponding to the IMSI set. For example, only one or several terminal devices corresponding to the IMSI set exist in a communication subnet serving the network device, and the network device sends the first-type indication signal only to the one or several terminal devices. In other words, that the first-type indication signal corresponds to an IMSI set does not mean the first-type indication signal needs to instruct all terminal devices corresponding to the IMSI set. However, the first-type indication signals used to indicate that terminal devices corresponding to an IMSI set have some common properties, such as a same transmission resource and/or a same transmission format.

In this embodiment of this application, for a case in which a terminal device is paged and/or a system message changes, the following technical solutions can be used.

Figure 5:
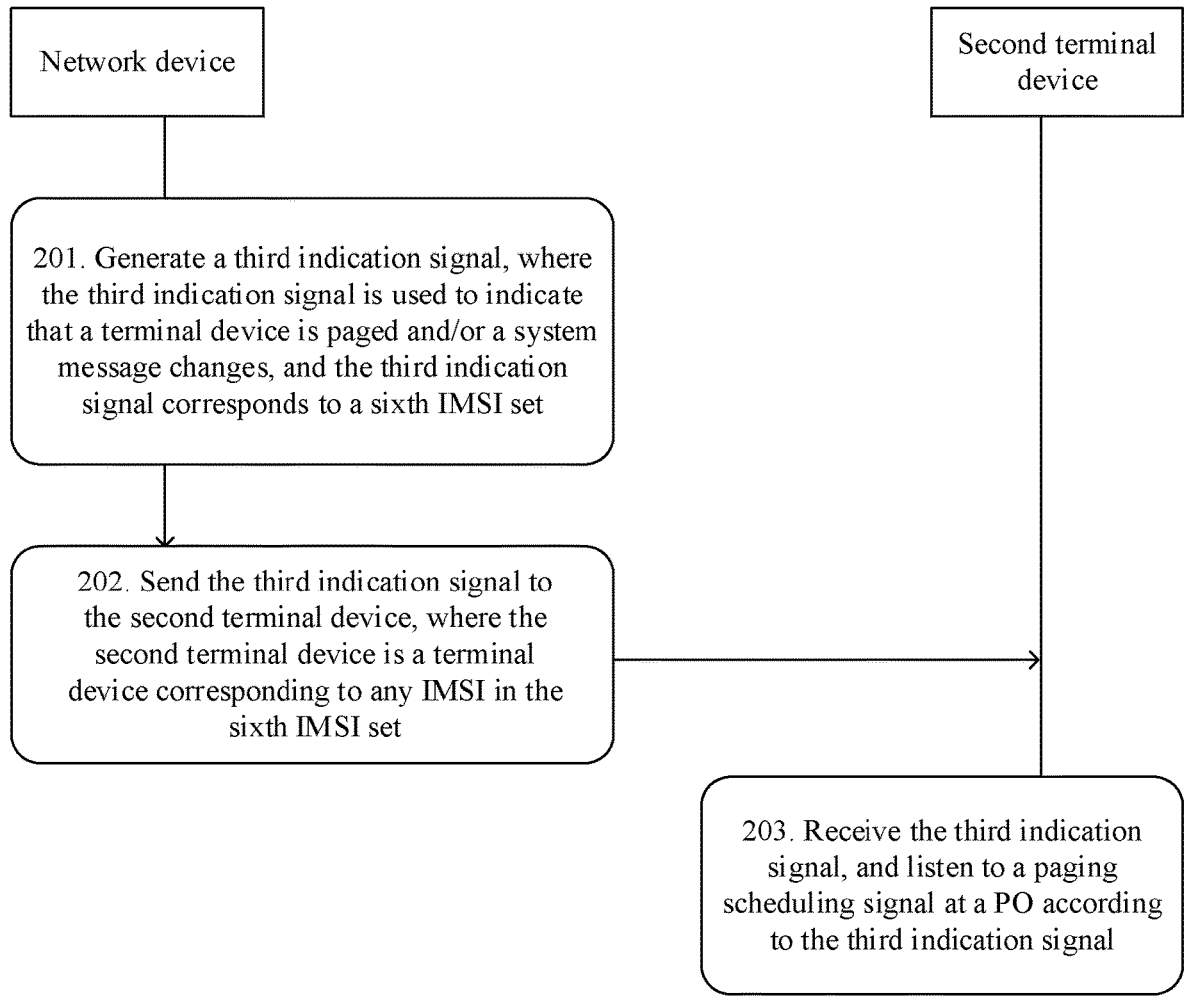
FIG. 5 is another schematic flowchart of a signal sending method according to an embodiment of this application.

Manner 1: Referring to FIG. 5, the signal sending method further includes the following steps.

Step 201. The network device generates a third indication signal, where the third indication signal is used to indicate that a terminal device is paged and/or a system message changes, the third indication signal corresponds to a sixth IMSI set, and a quantity of IMSIs in the sixth IMSI set is less than or equal to a quantity of IMSIs corresponding to one PO. The sixth IMSI set is any IMSI set conforming to any one of the correspondence 1 to the correspondence 8.

Step 202. The network device sends the third indication signal to a second terminal device, where the second terminal device is a terminal device corresponding to any IMSI in the sixth IMSI set.

Step 203. The second terminal device receives the third indication signal, and listens to a paging scheduling signal at the PO according to the third indication signal.

In this embodiment of this application, a signal that is used to indicate that a terminal device is paged and/or a system message changes is referred to as a second-type indication signal. The third indication signal is a second-type indication signal corresponding to the sixth IMSI set, and is an example of the second-type indication signal. The sixth IMSI set is any IMSI set conforming to any one of the correspondence 1 to the correspondence 8. The second-type indication signal may alternatively be a preset sequence or a data packet. When the first-type indication signal and the second-type indication signal are preset sequences, the preset sequences are different. When the first-type indication signal and the second-type indication signal are data packets, original information bits corresponding to the two data packets are different. In an optional manner, the second terminal device listens to a paging scheduling signal at an agreed PO according to the third indication signal. For an implementation of the agreed PO, refer to relevant description in step 103. In an optional manner, for a correspondence between the third indication signal and the sixth IMSI set, refer to the correspondence between the first indication signal and the first IMSI set.

In the foregoing technical solutions, when at least one terminal device corresponding to at least one IMSI in an IMSI set is paged and/or a system message changes, the network device generates a second-type indication signal, and sends the second-type indication signal to the terminal device corresponding to the IMSI set, and the terminal device listens to a paging scheduling signal at the PO after receiving the second-type indication signal. With reference to the solutions in step 101 to step 103, the network device separately sends indication signals of different types to a terminal device that corresponds to an IMSI set and that needs to listen to the paging scheduling signal and a terminal device that corresponds to the IMSI set and that does not need to listen to the paging scheduling signal, to be applicable to a case in which a plurality of terminal devices corresponding to one PO have different requirements for listening to the paging scheduling signal, thereby reducing a probability that another terminal device corresponding to a PO listens to the paging scheduling signal because some terminal devices corresponding to the PO are paged and/or a system message changes, and reducing power consumption of the terminal device that is not paged and/or whose system message does not change.

In an optional manner, a terminal device corresponding to an IMSI set may be paged, but a system message does not change. When any terminal device corresponding to the IMSI set is paged, the network device generates a second-type indication signal of a type 1, and the second-type indication signal of the type 1 is used to indicate that a terminal device is paged. Then, the network device sends the second-type indication signal of the type 1 to the terminal device corresponding to the IMSI set. After receiving the second-type indication signal of the type 1, the terminal device can listen to a paging scheduling signal at a PO.

In an optional manner, a system message of a terminal device corresponding to an IMSI set may change, but the terminal device is not paged. When a system message of any terminal device corresponding to the IMSI set changes, the network device generates a second-type indication signal of a type 2, and the second-type indication signal of the type 2 is used to indicate a system message of the terminal device changes. Then, the network device sends the second-type indication signal of the type 2 to the terminal device corresponding to the IMSI set. After receiving the second-type indication signal of the type 2, the terminal device can listen to a paging scheduling signal at a PO.

In an optional manner, a terminal device corresponding to an IMSI set may be paged, and a system message may change. When any terminal device corresponding to the IMSI set is paged and/or a system message changes, the network device generates a second-type indication signal of a type 3, and the second-type indication signal of the type 3 is used to indicate that a terminal device is paged and/or a system message changes. Then, the network device sends the second-type indication signal of the type 3 to the terminal device corresponding to the IMSI set. After receiving the second-type indication signal of the type 3, the terminal device can listen to a paging scheduling signal at a PO.

In an optional manner, a terminal device corresponding to each IMSI in the sixth IMSI set is paged and/or a system message changes. In other words, only the terminal device that is paged and/or whose system message changes can receive the second-type indication signal. This implementation can be used to achieve accurate indication, so that none of terminal devices corresponding to the sixth IMSI set listens to a paging scheduling signal if not being paged and/or no system message changes, to reduce a probability of wasting power because of an unnecessary operation of listening to the paging scheduling signal by the terminal device, thereby reducing the power consumption of the terminal device.

For ease of understanding, the following describes the manner 1 by using the IMSI set 1 and the IMSI set 2 as examples. In a first DRX cycle (where the first DRX cycle is any DRX cycle), if none of the terminal devices corresponding to the IMSI set 1 is paged and/or no system message changes, and a terminal device in the terminal devices corresponding to the IMSI set 2 is paged and/or a system message changes, the network device sends the first-type indication signal to the terminal device corresponding to the IMSI set 1, and sends the second-type indication signal to the terminal device corresponding to the IMSI set 2. The terminal device corresponding to the IMSI set 1 receives the first-type indication signal, and does not listen to the paging scheduling signal at a PO in the first DRX cycle. The terminal device corresponding to the IMSI set 2 receives the second-type indication signal, and listens to the paging scheduling signal at the PO in the first DRX cycle. A transmission resource for the first-type indication signal sent by the network device to the terminal device corresponding to the IMSI set 1 and a transmission resource for the second-type indication signal sent by the network device to the terminal device corresponding to the IMSI set 2 are different. Alternatively, a combination of a transmission resource for and a signal format of the first-type indication signal sent by the network device to the IMSI set 1 and a combination of a transmission resource for and a signal format of the second-type indication signal sent by the network device to the IMSI set 2 are different. Therefore, the terminal devices corresponding to the IMSI set 1 and the IMSI set 2 can correctly receive indication signals belonging to the terminal devices corresponding to the IMSI set 1 and the IMSI set 2.

It can be learned from this application example, in a DRX cycle, for different IMSI sets, the network device sends an indication signal to terminal devices corresponding to the IMSI sets. For an IMSI set corresponding to which none of terminal devices is paged and/or no system message changes, the network device sends the first-type indication signal to the terminal device corresponding to the IMSI set. For an IMSI set corresponding to which a terminal device is paged and/or a system message changes, the network device sends the second-type indication signal to the terminal device corresponding to the IMSI set.

For another example, if none of the terminal devices corresponding to the IMSI set 1 is paged and/or no system message changes in a first DRX cycle, and a terminal device in the terminal devices corresponding to the IMSI set 1 is paged and/or a system message changes in a second DRX cycle, the network device sends the first-type indication signal to the terminal device corresponding to the IMSI set 1 in the first DRX cycle, and sends the second-type indication signal to the terminal device corresponding to the IMSI set 2 in the second DRX cycle. The terminal device corresponding to the IMSI set 1 receives the first-type indication signal in the first DRX cycle, so that the terminal device does not listen to the paging scheduling signal at a PO in the first DRX cycle. The terminal device corresponding to the IMSI set 1 receives the second-type indication signal in the second DRX cycle, and listens to the paging scheduling signal at a PO in the second DRX cycle.

Figure 6A:
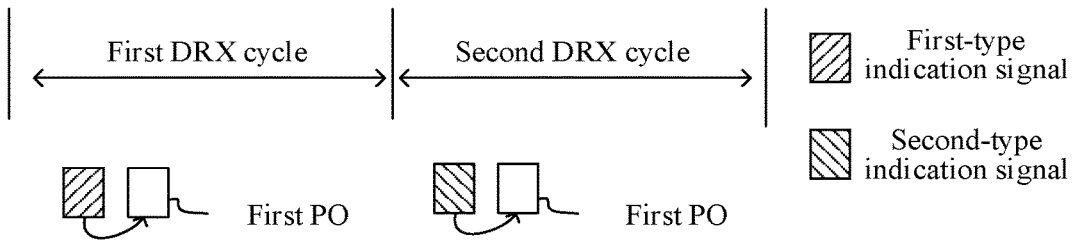
FIG. 6a to FIG. 6c are schematic diagrams of a first-type indication signal and a second-type indication signal, and a PO according to an embodiment of this application.

It can be learned from this application example, the network device may send an indication signal to an IMSI set in each DRX cycle. For an IMSI set corresponding to which a terminal device corresponding to the IMSI set is not paged and/or no system message changes in a DRX cycle, the network device sends the first-type indication signal to the terminal device corresponding to the IMSI set. For an IMSI set corresponding to which any terminal device corresponding to the IMSI set is paged and/or a system message changes in a DRX cycle, the network device sends the second-type indication signal to the terminal device corresponding to the IMSI set, as shown in FIG. 6*a*.

It should be noted that, the first-type indication signal and the second-type indication signal in this embodiment of this application may alternatively be considered as different states of an indication signal. For example, the network device and the IMSI set agree on a moment at which the network device sends the indication signal, and the network device sends the indication signal to terminal devices corresponding to the IMSI set at the agreed moment in each DRX cycle. When a terminal device corresponding to the IMSI set is not paged and/or no system message changes in a DRX cycle, an indication signal of a first state sent by the network device to the IMSI set is the first-type indication signal. When a terminal device corresponding to the IMSI set is paged and/or a system message changes in a DRX cycle, an indication signal of a second state sent by the network device to the IMSI set is the second-type indication signal.

Figure 6B:
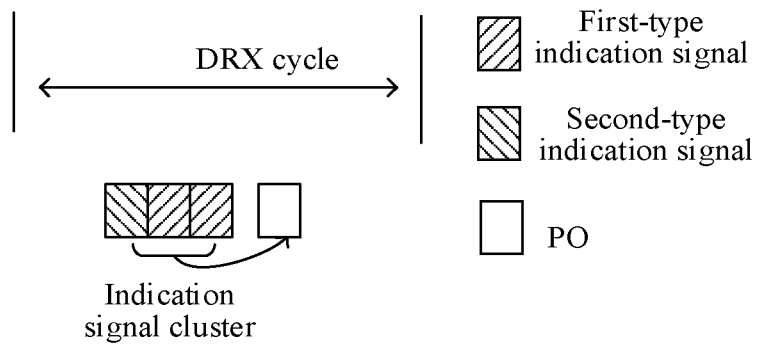
Figure 6C:
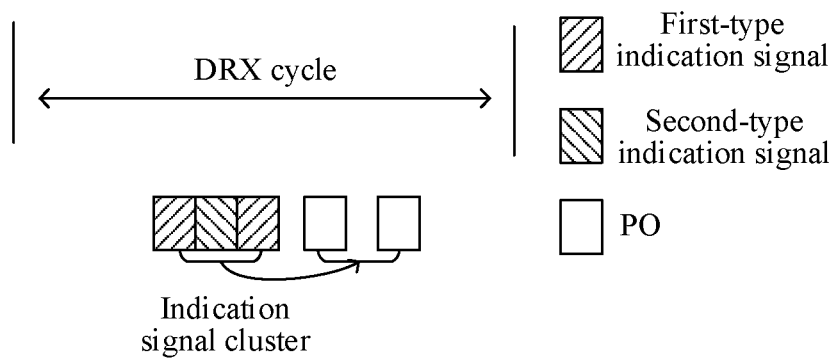

In an optional manner, the network device may send one or more indication signal clusters. Each indication signal cluster may include a plurality of consecutive first-type indication signals, or may include a plurality of consecutive second-type indication signals, or may include consecutive signals including at least one first-type indication signal and at least one second-type indication signal, as shown in FIG. 6*b* and FIG. 6*c*.

Manner 2: If a terminal device corresponding to an IMSI in the sixth IMSI set is paged and/or a system message changes, the network device does not send the first-type indication signal to the terminal device corresponding to the sixth IMSI set. The terminal device corresponding to the sixth IMSI set listens to the first-type indication signal. If the first-type indication signal is not received, the terminal device determines that the terminal device may be paged or a system message may change, and listens to the paging scheduling signal at a PO. The terminal device further determines, based on a paging signal on a PDSCH signal invoked by the received paging scheduling signal, whether the terminal device is paged or a system message changes.

For example, if in a first DRX cycle (where the first DRX cycle is any DRX cycle), none of the terminal devices corresponding to the IMSI set 1 is paged and/or no system message changes, and a terminal device in the terminal devices corresponding to the IMSI set 2 is paged and/or a system message changes, the network device sends the first-type indication signal to the terminal device corresponding to the IMSI set 1, and does not send the first-type indication signal to the terminal device corresponding to the IMSI set 2. The terminal device corresponding to the IMSI set 1 receives the first-type indication signal, and does not listen to the paging scheduling signal at a PO in the first DRX cycle. The terminal device corresponding to the IMSI set 2 does not receive the first-type indication signal, and listens to the paging scheduling signal at the PO in the first DRX cycle.

For another example, if none of the terminal devices corresponding to the IMSI set 1 is paged and/or no system message changes in a first DRX cycle, and a terminal device in the terminal devices corresponding to the IMSI set 1 is paged and/or a system message changes in a second DRX cycle, the network device sends the first-type indication signal to the terminal device corresponding to the IMSI set 1 in the first DRX cycle, and does not send the first-type indication signal to the terminal device corresponding to the IMSI set 1 in the second DRX cycle. The terminal device corresponding to the IMSI set 1 receives the first-type indication signal in the first DRX cycle, and does not listen to the paging scheduling signal at the PO in the first DRX cycle. The terminal device corresponding to the IMSI set 1 does not receive the first-type indication signal in the second DRX cycle, and listens to the paging scheduling signal at a PO in the second DRX cycle.

In the foregoing technical solutions, when a terminal device corresponding to an IMSI in the IMSI set is paged and/or a system message changes, the network device may not send the indication signal to the terminal device corresponding to the IMSI set, to save a resource, and the terminal device corresponding to the IMSI set can still correctly learn that the terminal device may be paged and/or a system message may change.

Embodiment 2

An embodiment of this application provides another signal sending method. The method includes: A network device generates a third indication signal, where the third indication signal is used to indicate that a terminal device is paged and/or a system message changes, a third indication signal corresponds to a sixth IMSI set, and a quantity of IMSIs in the sixth IMSI set is less than or equal to a quantity of IMSIs corresponding to one PO. Then, the network device sends the third indication signal to a second terminal device, where the second terminal device is a terminal device corresponding to any IMSI in the sixth IMSI set. Then, the second terminal device receives the third indication signal, and listens to a paging scheduling signal according to the third indication signal at a PO. For an implementation of the foregoing method, refer to the description in step 201 to step 203.

In Embodiment 2 of this application, when any terminal device corresponding to the IMSI set is paged and/or a system message changes, the network device sends a second-type indication signal to the terminal device corresponding to the IMSI set (where the third indication signal is an example of the second-type indication signal), and the terminal device may determine, after receiving the second-type indication signal, that the terminal device may be paged and/or a system message may change, so as to listen to the paging scheduling signal at a PO. Correspondingly, when none of terminal devices corresponding to the IMSI set is paged and/or no system message changes, the network device does not send the second-type indication signal to the terminal device corresponding to the IMSI set, and after the terminal device does not receive the second-type indication signal, the terminal device may determine that the terminal device is not paged and/or no system message changes, so as to not listen to the paging scheduling signal at the PO. Therefore, the terminal device needs to listen to the second-type indication signal only on a transmission resource agreed with the network device. If the terminal device receives the second-type indication signal, the terminal device listens to the paging scheduling signal at the PO. If the terminal device does not receive the second-type indication signal, the terminal device does not listen to the paging scheduling signal at the PO.

For example, in a first DRX cycle (where the first DRX cycle is any DRX cycle), if none of the terminal devices corresponding to an IMSI set 1 is paged and/or no system message changes, and a terminal device in the terminal devices corresponding to an IMSI set 2 is paged and/or a system message changes, the network device does not send the second-type indication signal to the terminal device corresponding to the IMSI set 1, and sends the second-type indication signal to the terminal device corresponding to the IMSI set 2. The terminal device corresponding to the IMSI set 1 does not receive the second-type indication signal, and does not listen to the paging scheduling signal at a PO in the first DRX cycle. The terminal device corresponding to the IMSI set 2 receives the second-type indication signal, and listens to the paging scheduling signal at the PO in the first DRX cycle.

For another example, if none of the terminal devices corresponding to the IMSI set 1 is paged and/or no system message changes in a first DRX cycle, and a terminal device in the terminal devices corresponding to the IMSI set 1 is paged and/or a system message changes in a second DRX cycle. The network device does not send the second-type indication signal to the terminal device corresponding to the IMSI set 1 in the first DRX cycle, and sends the second-type indication signal to the terminal device corresponding to the IMSI set 1 in the second DRX cycle. The terminal device corresponding to the IMSI set 1 does not receive the second-type indication signal in the first DRX cycle, and does not listen to the paging scheduling signal at the PO in the first DRX cycle. The terminal device corresponding to the IMSI set 1 receives the second-type indication signal in the second DRX cycle, and listens to the paging scheduling signal at a PO in the second DRX cycle.

In the foregoing technical solution, the network device differentiates the terminal device that corresponds to the IMSI set and that needs to listen to the paging scheduling signal and the terminal device that corresponds to the IMSI set and that does not need to listen to the paging scheduling signal. The network device sends the second-type indication signal only to the terminal device that corresponds to the IMSI set and that needs to listen to the paging scheduling signal, so that the terminal device that corresponds to the IMSI set and that needs to listen to the paging scheduling signal may determine, according to the second-type indication signal, that the terminal device may be paged and/or a system message may change, and the terminal device that corresponds to the IMSI set and that does not need to listen to the paging scheduling signal may determine that the terminal device may not be paged and/or no system message changes, to be applicable to a case in which a plurality of terminal devices corresponding to one PO have different requirements for listening to the paging scheduling signal, thereby reducing a probability that another terminal device corresponding to a PO listens to the paging scheduling signal because some terminal devices corresponding to the PO are paged and/or a system message changes, and reducing power consumption of the terminal device that is not paged and/or whose system message does not change.

Embodiment 3

Figure 7:
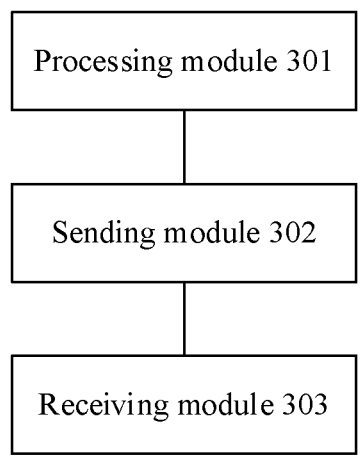
FIG. 7 is a schematic diagram of a network device according to an embodiment of this application.

FIG. 7 is a schematic diagram of a network device according to an embodiment of this application. The network device is configured to implement functions of the network device according to Embodiment 1. The network device includes: a processing module 301, configured to generate a first indication signal, where the first indication signal is used to indicate that a terminal device is not paged and/or no system message changes, the first indication signal corresponds to a first international mobile subscriber identity IMSI set, and a quantity of IMSIs in the first IMSI set is less than or equal to a quantity of IMSIs corresponding to one paging occasion PO; and a sending module 302, configured to send the first indication signal to a first terminal device, where the first terminal device is a terminal device corresponding to any IMSI in the first IMSI set.

Optionally, the processing module 301 is further configured to generate a third indication signal, where the third indication signal is used to indicate that a terminal device is paged and/or a system message changes, the third indication signal corresponds to a sixth IMSI set, and a quantity of IMSIs in the sixth IMSI set is less than or equal to a quantity of IMSIs corresponding to one PO.

The sending module 302 is further configured to send the third indication signal to a second terminal device, where the second terminal device is a terminal device corresponding to any IMSI in the sixth IMSI set.

Optionally, the network device may further include a receiving module 303, configured to receive a signal sent by the terminal device or another network element in a network.

Embodiment 4

Figure 8:
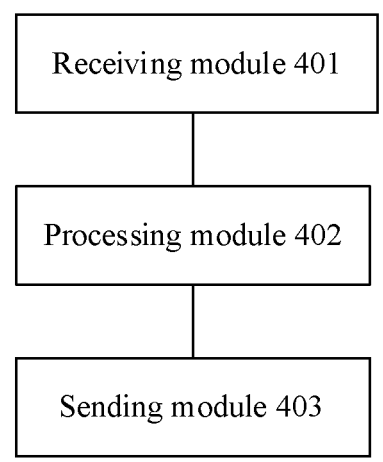
FIG. 8 is a schematic diagram of a terminal device according to an embodiment of this application.

FIG. 8 is a schematic diagram of a terminal device according to an embodiment of this application. The terminal device is configured to implement functions of the first terminal device according to Embodiment 1. The terminal device includes: a receiving module 401, configured to listen to an indication signal, where the indication signal includes a first indication signal, the first indication signal is used to indicate that a terminal device is not paged and/or no system message changes, the first indication signal corresponds to a first IMSI set, a quantity of IMSIs in the first IMSI set is less than or equal to a quantity of IMSIs corresponding to one PO, and an IMSI of the terminal device belongs to the first IMSI set; and a processing module 402, configured to maintain a state of not listening to a paging scheduling signal at a PO of the processing module 402 after the receiving module receives the first indication signal.

Optionally, the processing module 402 is further configured to listen to a paging scheduling signal at the PO of the processing module 402 after the receiving module 401 does not receive the first indication signal.

Optionally, the indication signal further includes a third indication signal, used to indicate that a terminal device is paged and/or a system message changes, and the third indication signal corresponds to the first IMSI set.

The processing module 402 is further configured to listen to a paging scheduling signal at the PO of the processing module 402 after the receiving module 401 receives the third indication signal.

Optionally, the terminal device may further include a sending module 403, configured to send a signal to a network device or another network element in a network.

Embodiment 5

Still referring to FIG. 7, this embodiment of this application provides a network device, including: a processing module, configured to generate a third indication signal, where the third indication signal is used to indicate that a terminal device is paged and/or a system message changes, the third indication signal corresponds to a sixth IMSI set, and a quantity of IMSIs in the sixth IMSI set is less than or equal to a quantity of IMSIs corresponding to one PO; and a sending module, configured to send the third indication signal to a second terminal device, where the second terminal device is a terminal device corresponding to any IMSI in the sixth IMSI set.

Optionally, the network device may further include a receiving module, configured to receive a signal sent by the terminal device or another network element in a network.

Embodiment 6

Still referring to FIG. 8, this embodiment of this application provides a network device, including: a receiving module, configured to listen to a third indication signal, where the third indication signal is used to indicate that a terminal device is paged and/or a system message changes, the third indication signal corresponds to a sixth IMSI set, a quantity of IMSIs in the sixth IMSI set is less than or equal to a quantity of IMSIs corresponding to one PO; and an IMSI of the network device belongs to the sixth IMSI set; and a processing module, configured to listen to a paging scheduling signal at a PO of the processing module after the receiving module receives the third indication signal.

Optionally, the terminal device may further include a sending module, configured to send a signal to the network device or another network element in a network.

It should be noted that, both the first IMSI set and the sixth IMSI set according to Embodiment 3 to Embodiment 6 can satisfy any one of the correspondence 1 to the correspondence 8 according to Embodiment 1. The correspondence between the first indication signal and the first IMSI set, and the correspondence between the third indication signal and the sixth IMSI set are described in Embodiment 1, and details are not described herein again. For an implementation of each module of the network device according to Embodiment 3, refer to the implementation of the network device according to Embodiment 1. For an implementation of each module of the terminal device according to Embodiment 4, refer to the implementation of the terminal device according to Embodiment 1. For an implementation of each module of the network device according to Embodiment 5, refer to the implementation of the network device according to Embodiment 2. For an implementation of each module of the terminal device according to Embodiment 6, refer to the implementation of the terminal device according to Embodiment 2.

In addition, division of the modules in Embodiments 3 to Embodiment 6 is an example, and is merely a logical function division. There may be another division manner during actual implementation. In addition, the functional modules in the embodiments of this application may be integrated into one processor, or each of the modules may exist alone physically, or two or more modules may be integrated into one module. The integrated module may be implemented in a form of hardware, or may be implemented in a form of a software functional module. When the integrated module may be implemented in the form of hardware, the hardware of an entity corresponding to the processing module may be a processor, configured to implement functions for the device to perform the method according to Embodiment 1 or Embodiment 2. The processor may be a central processing unit (CPU), a digital processing module, or the like. The hardware of an entity corresponding to the sending module may be a transmitter, and the hardware of an entity corresponding to the receiving module may be a receiver. The transmitter and the receiver are configured to support the device in communicating with another device in a communications system. The network device or the terminal device may further include a memory, configured to store a program executed by the processor. The memory may be a non-volatile memory, for example, a hard disk drive (HDD), or a solid-state drive (SSD), or may be a volatile memory, for example, a random access memory (RAM). The memory is any other medium that can carry or store expected program code in a form of an instruction or a data structure and that can be accessed by a computer, but is not limited thereto.

An embodiment of this application further provides a computer-readable storage medium. The readable storage medium stores a computer instruction, and when the instruction is run on a computer, the computer is enabled to perform the steps performed by the network device according to Embodiment 1 and Embodiment 2.

An embodiment of this application further provides a computer-readable storage medium. The readable storage medium stores a computer instruction, and when the instruction is run on a computer, the computer is enabled to perform the steps performed by the terminal device according to Embodiment 1 and Embodiment 2.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A signal sending method, comprising:
generating, by a network device, a first indication signal, wherein the first indication signal is used to indicate that a terminal device is not paged and/or a system message does not change, the first indication signal corresponds to a first international mobile subscriber identity (IMSI) set, and a quantity of IMSIs in the first IMSI set is less than or equal to a quantity of IMSIs corresponding to one paging occasion (PO); and
sending, by the network device, the first indication signal to a first terminal device, wherein the first terminal device is a terminal device corresponding to any IMSI in the first IMSI set.

2. The method according to claim 1, further comprising:
generating, by the network device, a second indication signal, wherein the second indication signal is used to indicate that a terminal device is paged and/or the system message changes, the second indication signal corresponds to a second IMSI set, and a quantity of IMSIs in the second IMSI set is less than or equal to a quantity of IMSIs corresponding to one PO; and
sending, by the network device, the second indication signal to a second terminal device, wherein the second terminal device is a terminal device corresponding to any IMSI in the first IMSI set.

3. The method according to claim 1, wherein the first IMSI set is a subset of an IMSI set corresponding to one PO.

4. The method according to claim 2, further comprising:
generating, by the network device, a third indication signal, wherein the third indication signal is used to indicate that a terminal device is paged and/or the system message changes, and the third indication signal corresponds to the first IMSI set,
wherein if the third indication signal is received by a first terminal device, the first terminal device determines a paging scheduling signal at the PO of the first terminal device.

5. A signal receiving method, comprising:
listening, by a first terminal device, for an indication signal, wherein the indication signal comprises a first indication signal, the first indication signal is used to indicate that a terminal device is not paged and/or a system message does not change, the first indication signal corresponds to a first international mobile subscriber identity (IMSI) set, a quantity of IMSIs in the first IMSI set is less than or equal to a quantity of IMSIs corresponding to one PO, and an IMSI of the first terminal device belongs to the first IMSI set; and
maintaining, by the first terminal device, a state of not listening to a paging scheduling signal at a PO of the first terminal device if the first indication signal is received, or
listening to, by the first terminal device, the paging scheduling signal at the PO of the first terminal device if the first indication signal is not received.

6. The method according to claim 5, wherein the indication signal further comprises a second indication signal that is used to indicate that a terminal device is paged and/or a system message changes, and the second indication signal corresponds to the first IMSI set,
the method further comprising:
listening to, by the first terminal device, a paging scheduling signal at the PO of the first terminal device if the second indication signal is received.

7. The method according to claim 5, wherein the first IMSI set is a subset of an IMSI set corresponding to one PO.

8. A network device, comprising:
a processor, configured to generate a first indication signal, wherein the first indication signal is used to indicate that a terminal device is not paged and/or a system message does not change, the first indication signal corresponds to a first international mobile subscriber identity (IMSI) set, and a quantity of IMSIs in the first IMSI set is less than or equal to a quantity of IMSIs corresponding to one paging occasion (PO); and
a transmitter, configured to send the first indication signal to a first terminal device, wherein the first terminal device is a terminal device corresponding to any IMSI in the first IMSI set.

9. The device according to claim 8, wherein:
the processor is further configured to generate a second indication signal, wherein the second indication signal is used to indicate that a terminal device is paged and/or a system message changes, the second indication signal corresponds to a second IMSI set, and a quantity of IMSIs in the second IMSI set is less than or equal to a quantity of IMSIs corresponding to one PO; and the transmitter is further configured to send the second indication signal to a second terminal device, wherein the second terminal device is a terminal device corresponding to any IMSI in the second IMSI set.

10. The method according to claim 8, wherein the first IMSI set is a subset of an IMSI set corresponding to one PO.

11. The method according to claim 8, wherein the first IMSI set comprises a plurality of subsets, and any one of the plurality of subsets is a subset of an IMSI set corresponding to any PO.

12. A terminal device, comprising:
a receiver, configured to listen for an indication signal, wherein the indication signal comprises a first indication signal, the first indication signal is used to indicate that the terminal device is not paged and/or a system message does not change, the first indication signal corresponds to a first IMSI set, a quantity of IMSIs in the first IMSI set is less than or equal to a quantity of IMSIs corresponding to one PO, and an IMSI of the terminal device belongs to the first IMSI set; and
a processor, configured to:
maintain a state of not listening to a paging scheduling signal at a PO of the processor if the receiver receives the first indication signal, or
listen to the paging scheduling signal at the PO of the processor if the receiver fails to receive the first indication signal.

13. The device according to claim 12, wherein the indication signal further comprises a second indication signal, used to indicate that the terminal device is paged and/or the system message changes, and the second indication signal corresponds to a second IMSI set; and
the processor is further configured to listen to the paging scheduling signal at the PO of the processor after the receiver receives the second indication signal.

14. The method according to claim 12, wherein the first IMSI set is a subset of an IMSI set corresponding to one PO.

15. The method according to claim 12, wherein the first IMSI set comprises a plurality of subsets, and any one of the plurality of subsets is a subset of an IMSI set corresponding to any PO.

16. The method according to claim 12, wherein the first IMSI set comprises at least one subset, and any one of the at least one subset is an IMSI set corresponding to at least one terminal device identity corresponding to a same PO.

17. The method according to claim 12, wherein the first IMSI set comprises a plurality of subsets, and any one of the plurality of subsets is an IMSI set corresponding to at least one terminal device identity corresponding to any PO.

18. The method according to claim 12, wherein:
the first IMSI set corresponds to a transmission resource for the first indication signal; or
the first IMSI set corresponds to a combination of the transmission resource for the first indication signal and a format of the first indication signal.

* * * * *